US011665609B2

(12) United States Patent
Boyapalle et al.

(10) Patent No.: US 11,665,609 B2
(45) Date of Patent: May 30, 2023

(54) SYSTEM AND METHOD FOR NETWORK INITIATED EMBEDDED SUBSCRIBER IDENTITY MODULE PROFILE CHANGES

(71) Applicant: Dell Products, LP, Round Rock, TX (US)

(72) Inventors: Anantha K. Boyapalle, Cedar Park, TX (US); Liam B. Quinn, Austin, TX (US); Kamal J. Koshy, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 226 days.

(21) Appl. No.: 16/942,730

(22) Filed: Jul. 29, 2020

(65) Prior Publication Data

US 2022/0038982 A1    Feb. 3, 2022

(51) Int. Cl.
*H04W 36/30* (2009.01)
*H04W 36/14* (2009.01)
(Continued)

(52) U.S. Cl.
CPC .......... *H04W 36/30* (2013.01); *H04B 17/318* (2015.01); *H04W 4/24* (2013.01);
(Continued)

(58) Field of Classification Search
None
See application file for complete search history.

(56) References Cited

U.S. PATENT DOCUMENTS

2013/0344855 A1* 12/2013 Li .......................... H04M 3/543
455/417

FOREIGN PATENT DOCUMENTS

CN    101729644 A  *  6/2010
FI        111584 B  *  8/2003
(Continued)

OTHER PUBLICATIONS

Knight_WO2007129081A1_pub.date_11-15-2007.pdf (Year: 2007).*

*Primary Examiner* — Marisol Figueroa
*Assistant Examiner* — Alexander J Yi
(74) *Attorney, Agent, or Firm* — Prol Intellectual Property Law, PLLC; H. Kenneth Prol

(57) ABSTRACT

An information handling system may include a processor; a memory; a network interface device to communicatively couple the information handling system to a first wireless communication networks of a plurality of wireless communication networks; an embedded subscriber identity module (eSIM) to provide data descriptive of wireless communication network-specific information to authenticate the information handling system; and an eSIM profile switching module to: monitor for signal strengths of each of a plurality of wireless communication networks. Upon discovering that the first wireless communication network has insufficient quality of service to sustain data transmission, send a request to a wireless communication network switching utility at a core communication network requesting roaming during a switch between the eSIM profile for a default wireless communication network to the second wireless communication network; and switch communication to the second wireless communication network while avoiding wireless service interruption with roaming if available.

20 Claims, 5 Drawing Sheets

(51) Int. Cl.
*H04W 8/18* (2009.01)
*H04B 17/318* (2015.01)
*H04W 24/08* (2009.01)
*H04W 28/24* (2009.01)
*H04W 36/00* (2009.01)
*H04W 4/24* (2018.01)

(52) U.S. Cl.
CPC ........... *H04W 8/183* (2013.01); *H04W 24/08* (2013.01); *H04W 28/24* (2013.01); *H04W 36/0088* (2013.01); *H04W 36/14* (2013.01)

(56) References Cited

FOREIGN PATENT DOCUMENTS

KR       20170012871 A  *  2/2017
TW        200421784 A  *  10/2004  ........ H04W 36/0055

\* cited by examiner

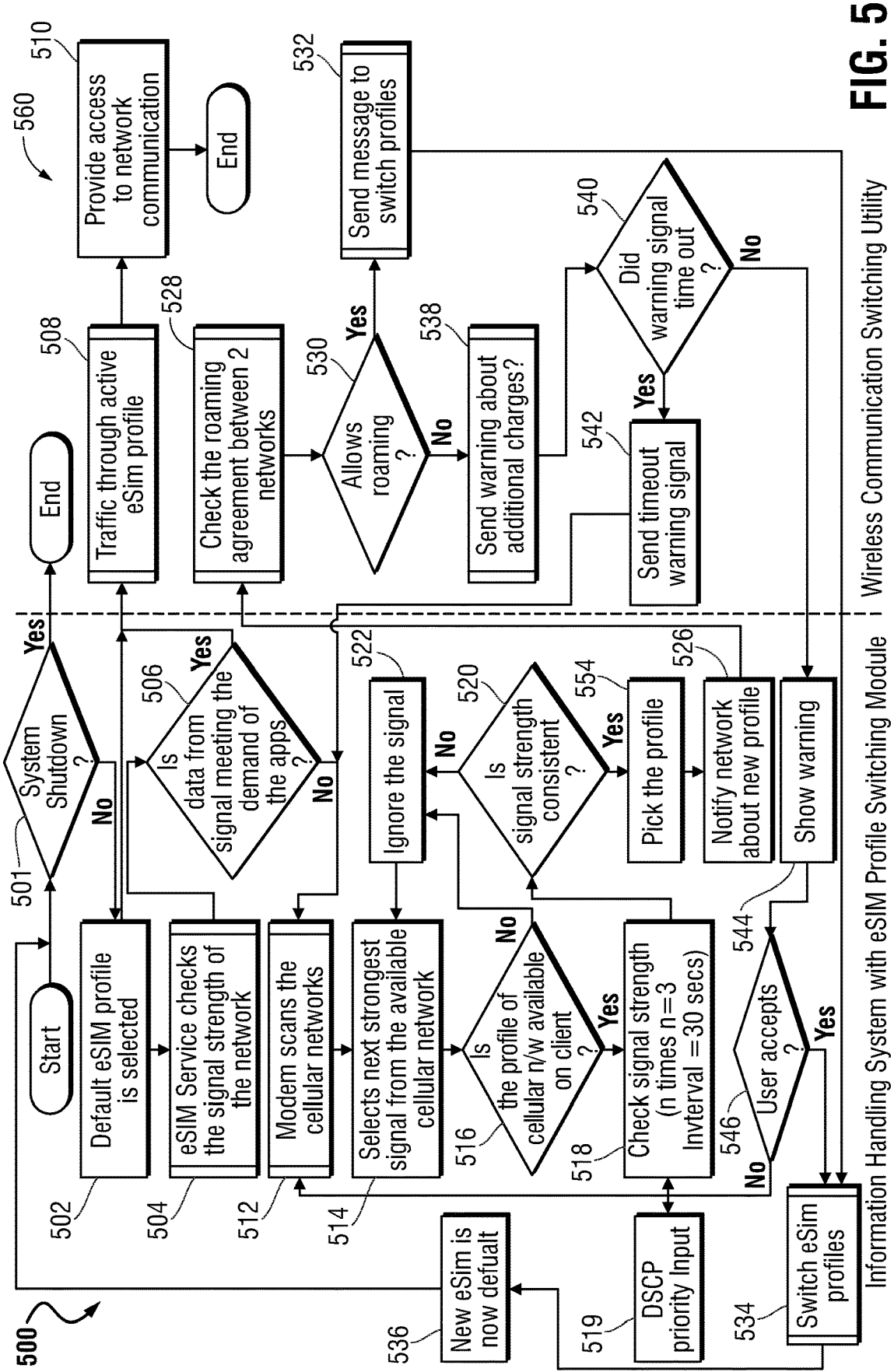

SYSTEM AND METHOD FOR NETWORK INITIATED EMBEDDED SUBSCRIBER IDENTITY MODULE PROFILE CHANGES

FIELD OF THE DISCLOSURE

The present disclosure generally relates to an information handling system having embedded subscriber identity module (eSIM) profile switching. The present disclosure more specifically relates to a system and method that implements a network to assist and initiate the switching of eSIM profiles.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include an eSIM used to wirelessly communicatively couple the information handling system to a core communication network.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 5 is a flow diagram illustrating a method of dynamically switching between wireless communication networks at an information handling system according to another embodiment of the present disclosure.

The use of the same reference symbols in different drawings may indicate similar or identical items.

DETAILED DESCRIPTION OF THE DRAWINGS

Figure 1:
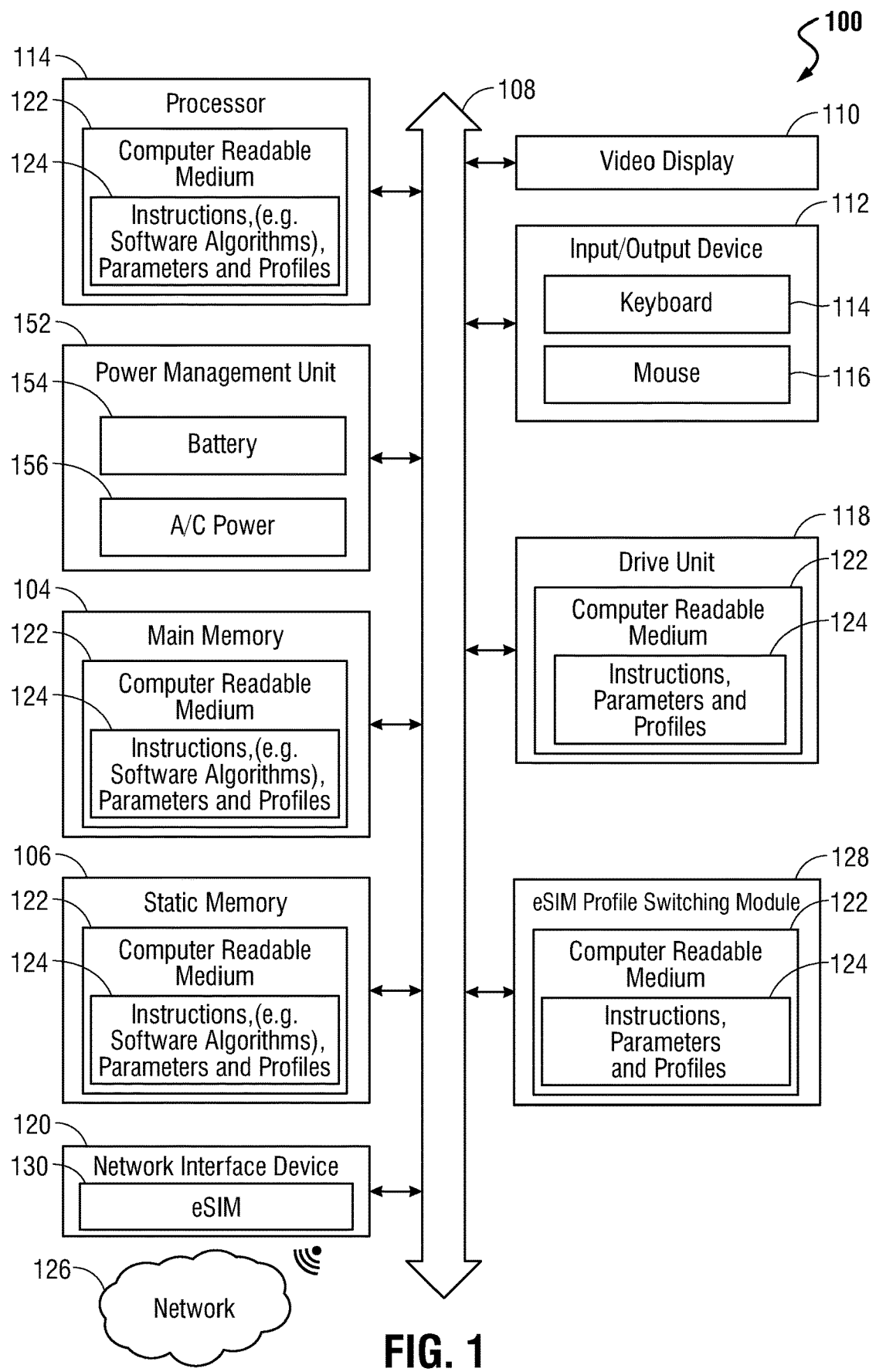
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Embodiments of the present disclosure provide for an information handling system that includes an eSIM profile switching module. The eSIM profile switching module coordinates with a core communication network to switch the information handling system from being communicatively coupled to a first wireless communication network to being communicatively coupled to a second wireless communication network. This switch may be conducted to meet signal data demands of applications being executed on the information handling system. In the embodiments described herein, the eSIM profile switching module may receive signals from the core communication network indicating that an eSIM profile associated with the first wireless communication network may be switched for an eSIM profile associated with the second wireless communication network. The eSIM profile switching module may, in and embodiment, provide for this switch in eSIM profiles by the core communication network agnostic of any wireless carrier that the eSIM profiles that may be associated with. In an embodiment, as the information handling system, via the eSIM profile switching module and a network interface device, initiates a request to switch between networks and when permission is provided from the core communication network and the roaming status, the information handling system switches the eSIM profile concurrently based upon the authorization to switch from the core communication network.

In an embodiment, if the wireless communication network being switched to has a roaming agreement with the user's current wireless carrier, the core communication network may notify the information handling system to switch the eSIM profile concurrently without notification that roaming has been initiated and without data stream signal interruption. In an embodiment, if the wireless communication network being switched to does not have a roaming agreement with the user's current wireless carrier, the core communication network may send a warning message to the information handling system indicating potential additional charges are to be incurred before the information handling system switches the eSIM profile concurrently without interruption of the signal data stream. In this example, the user may either accept that additional charges be applied or reject the additional charges. When the user accepts the additional charges, the eSIM profile switching module may switch the eSIM profile as described. When the user does not accept the additional charges, the eSIM profile switching module may allow the network interface device to scan for a new wireless communication network.

Prior to any request to switch from the first wireless communication network to the second wireless communication network, the network interface device of the information handling system may initiate communication with the core communication network via a default wireless communication network using a default eSIM profile. In an embodiment, the eSIM profile switching module or other module within the information handling system may determine whether the strength of the communication signal at the default wireless communication network is sufficient to meet a level of quality of service (QoS) for any data transmission. In a specific embodiment, the measurement of the QoS may include whether data requested or sent by one or more applications executed on the information handling system is being accomplished. Other QoS metrics may also be determined during this process. Where the QoS is not being met, the network interface device may conduct the scanning of wireless communication networks to select a next strongest signal associated with another wireless communication network. It is this new wireless communication network that the eSIM profile switching module notifies the core communication network that it will switch to. In the embodiments described herein, several next strongest signals may be scanned and the QoS checked to determine whether the strength of the communication signal, at these other wireless communication networks, is sufficient to meet a level of quality of service (QoS) for any data transmission.

The present specification describes an information handling system that, in an embodiment, includes a processor, a memory, and a network interface device to communicatively couple the information handling system to one of a plurality of wireless communication networks. The information handling system may also include an embedded subscriber identity module (eSIM) to provide data descriptive of wireless communication network-specific information to authenticate the information handling system with one or more core communication networks. Additionally, the information handling system may include an eSIM profile switching module to monitor for signal strengths of each of a plurality of wireless communication networks; upon discovering that a first wireless communication network has a sufficient quality of service (QoS) to sustain data transmission between the information handling system and the first wireless communication network, send a request to the core communication network requesting to switch the eSIM profile from a default wireless communication network to the first wireless communication network; and switch communication to the first wireless communication network upon receiving a signal from the core communication network whether or not roaming status allows the eSIM profile switching module to switch eSIM profiles by switching to an eSIM profile associated with the first wireless communication network at the information handling system.

The present specification also describes, in an embodiment, a method of dynamically switching between wireless communication networks at an information handling system. The method may include with a processor executing a network interface device: initiating communication, at a core communication network, with a default wireless communication network having a first embedded subscriber identity module (eSIM) profile associated therewith; determining that the signal strength associated with the default wireless communication network is not sufficient to maintain a sufficient quality of service (QoS) to service the transmission of data from one or more applications being executed on the information handling system; selecting a next strongest signal associated with a next strongest wireless communication network if signal strength is constant; and sending a notification to the core communication network requesting to switch the eSIM profile from a default wireless communication network to the next strongest wireless communication network. Additionally, the method may include switching the eSIM profile from the default wireless communication network to the next strongest wireless communication network using an eSIM profile switching module executed by the processor. This switching of eSIM profiles may occur without interruption when roaming may be involved between the default wireless communication network and the next strongest wireless communication network.

Unlike other systems and methods that do not interface with a core communication network prior to switching the eSIM profiles, the present information handling system and associated method benefits by switching eSIM profiles to the best possible wireless communication network by cooperating with the core communication network to receive roaming status and authorization to switch the eSIM profile without having calls being dropped or IP sessions being disconnected.

Turning now to the figures, FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a control system, a camera, a scanner, a printer, a pager, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g. random-access memory, etc.), nonvolatile (read-only memory, flash memory etc.) or any combination thereof), one or more processing resources, such as a central processing unit (CPU), a processor 102, a graphics processing unit (GPU), hardware or software control logic, or any combination thereof. Additional components of the information handling system 100 can include one or more storage devices, one or more communications ports for communicating with external devices, as well as, various input and output (I/O) devices 112, such as a keyboard 114, a mouse 116, a video/graphic display 110, or any combination thereof. The information handling system 100 can also include one or more buses 108 operable to transmit communications between the various hardware components. Portions of an information handling system 100 may themselves be considered information handling systems 100.

Information handling system 100 can include devices or modules that embody one or more of the devices or execute instructions for the one or more systems and modules described herein, and operates to perform one or more of the methods described herein. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 122 storing instructions 124 of the eSIM profile switching module 128, and drive unit 116 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices.

The information handling system 100 may further include a video display 110. The video display 110 in an embodiment may function as a liquid crystal display (LCD), an organic light emitting diode (OLED), a flat panel display, or a solid-state display. Additionally, the information handling system 100 may include an input/output device 112, such as a cursor control device (e.g., mouse 116, touchpad, or gesture or touch screen input, and a keyboard 114). The information handling system 100 can also include a disk drive unit 118.

The network interface device 120 may be wired or may be a wireless adapter can provide connectivity to a wireless communication network 126, e.g., a wide area network (WAN), a local area network (LAN), wireless local area network (WLAN), a wireless personal area network (WPAN), a wireless wide area network (WWAN), a core communication network, any of a plurality of data communication networks, or other networks. Connectivity may be via wired or wireless connection. The network interface device 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. In some aspects of the present disclosure, one wireless adapter 120 may operate two or more wireless links.

Wireless adapter 120 may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WLAN standards and WWAN carriers, which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available channels may be available under the 5 GHz shared communication frequency band. WLAN, for example, may also operate at a 2.4 GHz band. WWAN may operate in a number of bands, some of which are proprietary but may include a wireless communication frequency band at approximately 2.5 GHz band for example. In additional examples, WWAN carrier licensed bands may operate at frequency bands of approximately 700 MHz, 800 MHz, 1900 MHz, or 1700/2100 MHz for example as well. Other WWAN carrier bands, such as various 5G spectrum band may operate in frequency range (FR) 1 (sub-6 GHz) or FR2 (>5 GHz) bands according to embodiments herein. As described herein, the information handling system 100 may determine which of the frequency bands (e.g., RF frequency bands) are available to the information handling system 100, either licensed or unlicensed, to transmit data across the wireless communication network 126.

In some embodiments, software, firmware, dedicated hardware implementations such as application specific integrated circuits, programmable logic arrays and other hardware devices can be constructed to implement one or more of some systems and methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal, so that a device connected to a wireless communication network 126 can communicate voice, video or data over the network 126. Further, the instructions 124 may be transmitted or received over the wireless communication network 126 via the network interface device 120 or wireless adapter.

The information handling system 100 can include a set of instructions 124 that can be executed to cause the computer system to perform any one or more of the methods or computer-based functions disclosed herein. For example, instructions 124 may execute an eSIM profile switching module 128, software agents, or other aspects or components. Various software modules comprising application instructions 124 may be coordinated by an operating system (OS), and/or via an application programming interface (API) and may execute a variety of applications on the information handling system 100 requiring various levels of data communications via a wireless communication network 126. An example operating system may include Windows®, Android®, and other OS types. Example APIs may include Win 32, Core Java API, or Android APIs.

The disk drive unit 118 and the eSIM profile switching module 128 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124. The disk drive unit 118 and static memory 106 may also contain space for data storage. Further, the instructions 124 may embody one or more of the methods or logic as described herein. For example, instructions relating to the eSIM profile switching module 128 software algorithms, processes, and/or methods may be stored here. In a particular embodiment, the instructions, parameters, and profiles 124 may reside completely, or at least partially, within the main memory 104, the static memory 106, and/or within the disk drive 118 during execution by the processor 102 of information handling system 100. As explained, some or all of the eSIM profile switching module 128 may be executed locally or remotely. The main memory 104 and the processor 102 also may include computer-readable media 122.

Main memory 104 may contain computer-readable medium 122, such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium 122, such as NOR or NAND flash memory in some example embodiments. The eSIM profile switching module 128 may be stored in static memory 106, or the drive unit 116 on a computer-readable medium 122 such as a flash memory or magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include eSIM profile switching module 128 that may be operably connected to the bus 108. The eSIM profile switching module 128 computer readable medium 122 may also contain space for data storage such as for eSIM profiles or to store signal quality data. The eSIM profile switching module 128 may, according to the present description, perform tasks related to initiating communication, at a core communication network, with a default wireless communication network having a first embedded subscriber identity module (eSIM) profile associated therewith; sampling and determining that the signal strength associated with the default wireless communication network is not sufficient to maintain a sufficient quality of service (QoS) to service the transmission of data from one or more applications being executed on the information handling system; and selecting a next strongest signal associated with a first wireless communication network. In some embodiments, eSIM profile switching module 128 may interface with an eSIM 130 that may electronically store, for example, an international mobile subscriber identity (IMSI) number and a related key, which are used to identify and authenticate subscribers on the information handling system 100. In specific embodiments described herein, the eSIM profile switching module 128 may interface with the eSIM 130 of the network interface device 120 so that, when authorization is received from a core network to switch from a first communication network to a second communication network, the signal associated with the first communication network may be switched to the signal associated with the second communication network. This core network-controlled assessment of roaming and switching between communication networks allows for a seamless and uninterrupted communication to a network without calls being dropped or data transmission being stopped. In some embodiments described herein, the network interface device 120 may receive information from the core network indicating that switching from a first communication to the second communication network will result in roaming charges. In this embodiment, the eSIM profile switching module 128 may cause a message to be presented to the user of the information handling system 100 requesting authorization that the switch be allowed. The eSIM profile switching module 128 may then, upon receiving approval, moves forward with the switch and notifies the core network to seamlessly switch to the signal associated with the second communication network.

During operation, the eSIM profile switching module 128 may request that the communication network be switched based on a number of criteria. Upon powering up the information handling system 100, the network interface device 120 may communicate with a core network to establish communication with a default communication network. This default communication network may be part of a core communication network that includes communication hardware associated with a specific wireless carrier. This default communication network may have resources available to the user to utilize based on, for example, a subscription to use that default communication network. When communication is established between the information handling system 100 and the default communication network, the eSIM profile switching module 128, upon execution of the processor 102, may cause the network interface device 120 to determine whether a sufficient level of QoS is being maintained at the signal used to communicatively couple the information handling system 100 to that default communication network and also satisfy data requirements of applications executing on the information handling system 100. In some embodiments, weak signal strength, low bandwidth, received signal strength indicator (RSSI) along with other QoS metrics, may indicate that the QoS has dropped below an acceptable level. For example, where data transmission over the signal associated with the default communication network is insufficient to facilitate the data being transmitted by one or more applications running on the information handling system 100, the QoS may be insufficient and the network interface device 120 may be directed to take action to increase the QoS. Various applications may have differing DSCP priority levels and, thus, may tolerate distinct level of QoS sufficiency.

One method of increasing the QoS is to search for a relatively stronger signal received at the network interface device 120. During operation, the network interface device 120 may search for by scanning and identifying a plurality of wireless signals apart from the wireless signal associated with the default communication network. The network interface device 120 may then select from the plurality of available wireless signals that next strongest signal. In a specific embodiment, the network interface device 120 may do so by ranking the plurality of wireless signals from average strength to weakest strength.

After selecting the next strongest signal, the network interface device 120 may be directed by the eSIM profile switching module 128 to initially check to see if the signal strength is stable. This may be done by checking the signal strength of this next strongest signal a number of times for a period of time. For example, the network interface device 120 may check the signal strength three times over thirty seconds. The network interface device 120 may check the stability of the signal strength any number of times over any period of time and the present specification contemplates that these variables may change based on motion, system design, or functionalities currently operating. The number of times the network interface device 120 checks the signal strength and the duration of time that occurs within may be based on the QoS requirements of any application being executed on the information handling system 100. For example, where a videoconferencing application is being executed on the information handling system 100, the number of times the signal strength is checked may be increased to assure that the signal would support larger bandwidth and throughput. This may change, however, if, for example, an email application is being executed on the information handling system 100. In this other example, the duration of time and instances when the network interface device 120 checks that signal may be significantly reduced based on the lower QoS requirements for the execution of that application (e.g., relatively less bandwidth, less throughput, etc.).

After the signal strength and its stability has been confirmed, the eSIM profile switching module 128 may direct the network interface device 120 to select that next strongest signal and notify the core network that the information handling system 100 wishes to switch from the default communication network to this communication network associated with this next strongest signal.

In the embodiments described herein, a signal may be sent to a core network that monitors the connection between the information handling system and a wireless communication network. In a specific embodiment, the core network may direct telephone calls over a telephone network and/or delivers routes to transmit data among various sub-networks. The core network may receive the signal from the information handling system 100 to request that the communication network is to be switched.

In the present specification a first default communication network to which the information handling system 100 is currently communicatively coupled to may be associated with a specific carrier used to provide wireless communication services based on, for example, a subscription. This default communication network may be associated with other communication networks that may or may not allow for roaming by the information handling system 100 from the default communication network to another cooperating communication network. The signal sent to the core network requests a switch from the default network to another communication network associated with the next strongest signal detected and selected by the information handling system 100. To facilitate this switching, the core network may check if any roaming agreements exist between the carrier of the default network and a carrier associated with the next strongest signal detected by the information handling system 100. Where roaming is allowed the core communication network may send an initiation signal to the information handling system 100 and the eSIM profile switching module 128 to switch from the default communication network to the second communication network associated with the next strongest signal. The core communication network will then seamlessly, and without interruption to data or voice transmission, switch communication networks as described herein and invoke roaming under the roaming agreement between the two networks. Where there is no roaming agreement with the second communication network associated with the next strongest signal, the core network may notify the information handling system 100 and wait for approval to proceed to switch from the default communication network to the second communication network before incurring roaming charges.

Again, this process allows for switching among a plurality of communication networks using an eSIM profile switching module 128. Switching from one communication network to another is based on the signals detected at the network interface device 120 and their relative strength. Where a default communication network is insufficient to provide a level of QoS, the network interface device 120 may search for and detect next strongest signals regardless of a carrier or any contract or subscription the information handling system 100 may or may not be associated with. The core communication network may initiate roaming and provide for the seamless switching thereby preventing any drop in calls or disruption of data transmission to and from the information handling system 100 while the switch between wireless communication networks occurs. This process also increases the effectiveness of the core communication network by allowing for the assignment of the best possible communication network to each information handling system 100 coupled thereto. This process prevents the default network from bogging down with retries and other issues if wireless conditions are not optimal. This process executed by the eSIM profile switching module 128 and network interface device 120 at the information handling system 100 provides for the notification to a user about the switching of the networks as well as potential charges may be incurred where a roaming contract is not found by the core communication network. The user may reject these additional charges and the network interface device 120 may continue to check for the next, next strongest signal received at the information handling system 100 and the process may be repeated until a switch is accomplished. It is appreciated that the switch from one communication network to another is based on the QoS realized at any detected signal at the information handling system 100 as well as the cooperation by the core communication network to switch from a first (e.g., default or other) communication network to a second communication network. This process may be completed any number of times to provide the user of the information handling system 100 with the best data/voice transmission to a communication network.

In a specific embodiment, the core communication network may be communicatively coupled to a database that describes the roaming contracts among the various communication networks accessible by the information handling system 100 for transition from the default communication network. As such, when the core communication network checks whether any roaming agreements exist between the carrier of the default network and a carrier associated with the next strongest signal, the core communication network refers to this database to determine whether to automatically complete the switch seamlessly with roaming or to send a roaming warning to the information handling system 100. In some examples, no roaming agreement may be available between the carrier subscription by the information handling system 100. In this example, the core communication network may so notify the information handling system 100 that this carrier has no agreement with current carrier associated with the information handling system and to select another, next strongest signal.

In an embodiment, the eSIM profile switching module 128 may communicate with the main memory 104, the processor 102, the video display 110, the alpha-numeric input device 112, and the network interface device 120 via bus 108, and several forms of communication may be used, including ACPI, SMBus, a 24 MHZ BFSK-coded transmission channel, or shared memory. Keyboard driver software, firmware, controllers and the like may communicate with applications on the information handling system 100.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. In an embodiment an information handling system 100 may include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
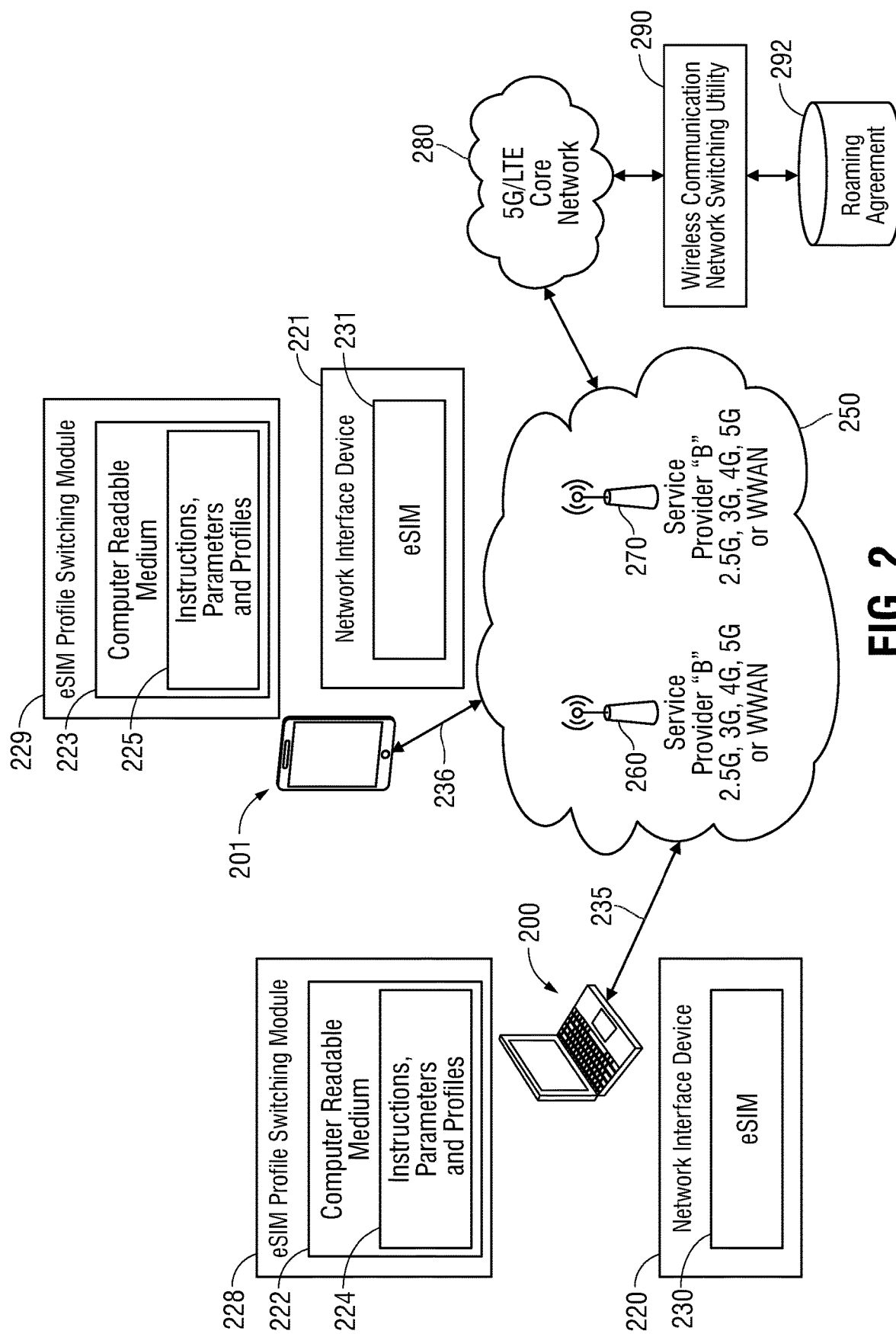
FIG. 2 is a block diagram of a network environment offering several wireless communication protocol options and mobile information handling systems according to an embodiment of the present disclosure.

FIG. 2 is a block diagram of a network environment offering several wireless communication protocol options for a plurality of information handling systems 200 according to an embodiment of the present disclosure. FIG. 2 illustrates a 5G/LTE core communication network 280 that may be communicatively coupled to a macro- and micro-communication network 250 that includes a plurality of individual wireless communication networks 260, 270 that communicatively couples one or more information handling systems 200, 201 such as the information handling system described in connection with FIG. 1 to one of these wireless communication networks 260, 270.

In a particular embodiment, a 5G/LTE core communication network 280 may be communicatively coupled to one or more networked mobile information handling systems 200 via wireless links 235, 236 to a wireless communication network 260 or 270. The 5G/LTE core communication network 280 may direct each of the information handling systems 200 to be communicatively coupled to one of the wireless communication networks 260, 270 via, for example, wireless access points and multiple wireless connection link options. Although two wireless communication networks 260, 270 are depicted, any plurality of wireless networks may be present in various embodiments. A variety of additional computing resources of the 5G/LTE core communication network 280 may include client mobile information handling systems, data processing servers, network storage devices, local and wide area networks, or other resources as needed or desired. As partially depicted, the information handling systems 200 or 201 may be a laptop computer, tablet computer, 360-degree convertible systems, wearable computing devices, a smart phone device or other computing devices. These information handling systems 200 may access the 5G/LTE core communication network 280 via these access points. These access points may include Wi-Fi-enabled access point, private and public long-term evolution (LTE)-enabled access points, and 5G new radio (NR)-enabled access points and may include a plurality of each to allow for the mobile information handling systems 200, 201 to communicate with the wireless communication networks 260, 270 (e.g., a Wi-Fi communication network, a public LTE communication network, and a private LTE communication network, among others). The present specification contemplates that the number of access points may communicatively couple the information handling system 200, 201 to the 5G/LTE core communication network 280 in order to form a multi-channel network that includes a Wi-Fi network, a 5G network, and a public and private LTE network, among others. In an example, the 5G/LTE core communication network 280 may be accessed through the wireless local area network (WLAN), a wireless personal area network (WPAN), or a wireless wide area network (WWAN). In an example embodiment, LTE-LAA WWAN may operate with a small-cell WWAN wireless access point option to access the 5G/LTE core communication network 280.

Components of a 5G/LTE core communication network 280 may be connected by wireline or Ethernet connections from a wider external network. For example, wireless 5G NR-enabled or other local wireless access points may be connected to a wireless network controller and an Ethernet switch. Information handling system's 200, 201 may support wireless communications across the core communication network 280 may be via standard protocols such as IEEE 802.11 Wi-Fi, IEEE 802.11ad WiGig, IEEE 802.15 WPAN, or 5G small cell WWAN communications such as gNodeB or eNodeB, IEEE 802.11, IEEE 1914/1904, IEEE P2413/1471/42010, access points implementing 802.11b, 802.11a, 802.11g, 802.11n, 802.11ac, and 802.11ax IEEE standards, or similar wireless network protocols developed for 5G, LTE, and Wi-Fi communications.

In an embodiment, other available wireless links associated with the 5G/LTE core communication network 280 may include one or more service providers associated with those wireless communication networks 260, 270. Service provider macro-cellular connections may include 2G standards such as GSM, 2.5G standards such as GSM EDGE and GPRS, 3G standards such as W-CDMA/UMTS and CDMA 2000, 4G standards, or 5G standards including WiMAX, LTE, and LTE Advanced, LTE-LAA, small cell WWAN, and the like. The 5G/LTE core communication network 280 and wireless communication networks 260, 270 may include a variety of licensed, unlicensed or shared communication frequency bands as well as a variety of wireless protocol technologies ranging from those operating in macrocells, small cells, picocells, or femtocells. As mentioned herein, each of the wireless communication networks 260, 270 may be associated with a cellular company that contracts with the users of the information handling systems 200 to provide wireless service access. Access to these wireless communication networks 260, 270 may require a current subscription and identification via a subscriber identity module (SIM). Instead of a SIM card, current information handling systems 200, 201 may maintain an electronic SIM or eSIM 230, 231 in each respective network interface device 220, 221. During operation, the 5G/LTE core communication network 280 may oversee the switching from a first wireless communication network 260 to a second wireless communication network 270 as described.

The 5G/LTE core communication network 280 may contain externally accessible computing resources of a wireless communication network switching utility 290 and connect to via the macro- and micro-communication network 250 to oversee the communicative coupling of the information handling systems 200 to one of the wireless communication networks 260, 270. The wireless communication network switching utility 290 may access a roaming agreements database 292. The 5G/LTE core communication network 280 may contain multiple intermediate web servers or other locations with accessible data (not shown). The 5G/LTE core communication network 280 may also connect to other wireless networks similar to the wireless communication networks 260, 270 and additional mobile information handling systems such as 200, 201 or similar connected to those additional wireless networks. A connection between the wireless communication networks 260, 270 and remote data center, for example, or other connection to other additional wireless networks may be via Ethernet or another similar connection to the world-wide-web, a WAN, a LAN, or other network structure to such a wireless communication network switching utility 290. Such a connection may be made via an access point/Ethernet switch to the external network and be a backhaul connection. The access point may be connected to one or more wireless access points before connecting directly to a mobile information handling system or may connect directly to one or more information handling systems 200. Alternatively, the information handling systems 200 may connect to the external network via base station locations at the wireless communication networks 260, 270. These wireless communication networks 260, 270 base station locations may be network connected via backhaul connectivity through the 5G/LTE core communication network 280 to wireless communication network switching utility 290.

Remote data centers may include web servers or resources within a cloud environment that operate via the 5G/LTE core communication network 280 or other wider internet connectivity. For example, remote data centers may include additional information handling systems, data processing servers, network storage devices, local and wide area networks, or other resources as needed or desired. Having such remote capabilities may also permit fewer resources to be maintained at the information handling systems 200 allowing streamlining and efficiency within those devices. In an example where the information handling systems 200, 201 includes streaming applications or other high data throughput application, those processing resources at the remote data centers may supplement the high volume of processing used to provide those processes described herein. Similarly, remote data center permits fewer resources to be maintained in other parts of the 5G/LTE core communication network 280 or a server associated therewith. Thus, certain QoS levels of wireless links 235, 236 via wireless communication networks 260, 270 may be needed for applications running on information handling systems 200, 201 to be supported by data streams with remote capability resources.

Each of the information handling systems 200, 201 may include their own eSIM profile switching module 228, 229 and a network interface device 220, 221 with its eSIM 230, 231. As described, the eSIM profile switching module 228 or 229 may request that the wireless communication networks 260, 270 be switched based on a number of criteria. Upon powering up the information handling system 200, 201, the network interface device 220 or 221 may communicate with the 5G/LTE core communication network 280 to establish communication with a default wireless communication network, for example either 260 or 270. A "default" wireless communication network may be any of the wireless communication networks 260, 270 that the 5G/LTE core communication network 280 knows the information handling system 200 or 201 has a subscription with. This default wireless communication networks 260 or 270 may be part of the 5G/LTE core communication network 280 that includes communication hardware associated with a specific wireless carrier associated with that subscription. This default wireless communication networks 260, 270 may have resources available to the user to utilize based on, for example, that subscription to use that default communication network. When communication is established between the information handling system 200 and a default wireless communication networks say 260, for example, the eSIM profile switching module 228, upon execution of a processor of the information handling system 200, may cause the network interface device 220 to determine whether a sufficient level of QoS is being maintained at the signal associated with the default wireless communication network 260. In some embodiments, weak signal strength and low bandwidth, along with other QoS metrics, may indicate that the QoS has dropped below an acceptable level. For example, where data transmission over the signal associated with the default wireless communication networks 260, 270 is insufficient to facilitate the data being transmitted or received by an application running on the information handling system 200 to remote resources, the QoS may be insufficient and the network interface device 220 may be directed to take action to increase the QoS.

One method of increasing the QoS is to search for a relatively stronger signal received at the network interface device 220 in an example embodiment. During operation, the network interface device 220 may search for and identify a plurality of wireless signals apart from the wireless signal associated with the default wireless communication network 260. For better understanding of the present example, the first wireless communication network 260 may be identified as the "default" communication network herein. The network interface device 220 may then select from the plurality of available wireless signals that next strongest signal. In a specific embodiment, the network interface device 220 may do so by ranking the plurality of wireless signals from average strength to weakest strength.

After selecting the next strongest signal, the network interface device 220 may be directed by the eSIM profile switching module 228 to initially check to see if the signal strength is stable. This may be done by checking the signal strength of this next strongest signal a number of times for a period of time. For example, the network interface device 220 may check the signal strength three times over thirty seconds. The network interface device 220 may check the stability of the signal strength any number of times over any period of time and the present specification contemplates that these variables may change based on system design and functionalities. For example, data streams having different DSCP priority may have a different number or duration of checks for signal stability.

After the signal strength and its stability has been confirmed, the eSIM profile switching module 228 may direct the network interface device 220 to select that next strongest signal and notify the 5G/LTE core communication network 280 by any wireless connections including the default wireless communication network 260 that the information handling system 200 wishes to switch from the first wireless communication network 260 to this communication network associated with the next strongest signal. Again, for purposes of explanation, the next strongest signal detected by the network interface device 220 may be associated with a second wireless communication network 270 accessible by the 5G/LTE core communication network 280.

In the embodiments described herein, a signal may be sent to the 5G/LTE core communication network 280 and a wireless communication network switching utility 290 that monitors the connection between the information handling system 200 and the first wireless communication network 260 or second wireless communication network 270. In a specific embodiment, the 5G/LTE core communication network 280 and a wireless communication network switching utility 290 may direct telephone calls over a telephone network and/or delivers routes to transmit data among various sub-networks. The 5G/LTE core communication network 280 and a wireless communication network switching utility 290 may receive the signal from the information handling system 200 to request that the first wireless communication network 260 is to be switched to the second wireless communication network 270 associated with the next strongest signal detected by the network interface device 220.

In the present specification, the first wireless communication network 260 to which the information handling system 200 is currently communicatively coupled to may be associated with a specific carrier used to provide wireless communication services based on, for example, a subscription. This first wireless communication network 260 may be associated with other communication networks that may or may not allow for roaming by the information handling system 200 from the first wireless communication network 260 to another cooperating communication network (e.g., the second wireless communication network 270). The signal sent to wireless communication network switching utility 290 in the 5G/LTE core communication network 280 by the information handling system 200 notifies a switch from the first wireless communication network 260 to the second wireless communication network 270 associated with the next strongest signal detected and selected by the information handling system 200. To facilitate this switching, the 5G/LTE core communication network 280 may check if any roaming agreements exist between the carrier of the first wireless communication network 260 and a carrier associated with second wireless communication network 270 by access to a roaming agreement database 292 for example. Where roaming is allowed, the wireless communication network switching utility 290 may send via the 5G/LTE core communication network 280 a notice to the information handling system 200 and the eSIM profile switching module 228 to switch from the first wireless communication network 260 to the second wireless communication network 270. The 5G/LTE core communication network 280 will then seamlessly, and without interruption to data or voice transmission, switch communication networks as described herein with any gap in service during the switch between wireless communication networks 260 and 270 filled via the roaming service. Where there is no roaming allowed with the second wireless communication network 270 associated with the next strongest signal, roaming may still occur to fill any gaps in service during switching at an incurred cost, but the roaming service is not guaranteed. The 5G/LTE core communication network 280 may notify the information handling system 200 that a roaming cost may be incurred and wait for approval to proceed to switch from the first wireless communication network 260 to the second wireless communication network 270 and attempt to utilize roaming during the switch. Similar seamless switching between networks 260 and 270 may be conducted by an information handling system such as 201 with access to the wireless communication network switching utility 290 in the 5G/LTE core communication network 280. The information handling system 201 may utilize eSIM profiles module 229 to switch profiles in the eSIM 231 of the NID 221 similarly using the wireless communication network switching utility 290 to invoke roaming if available.

Figure 3:
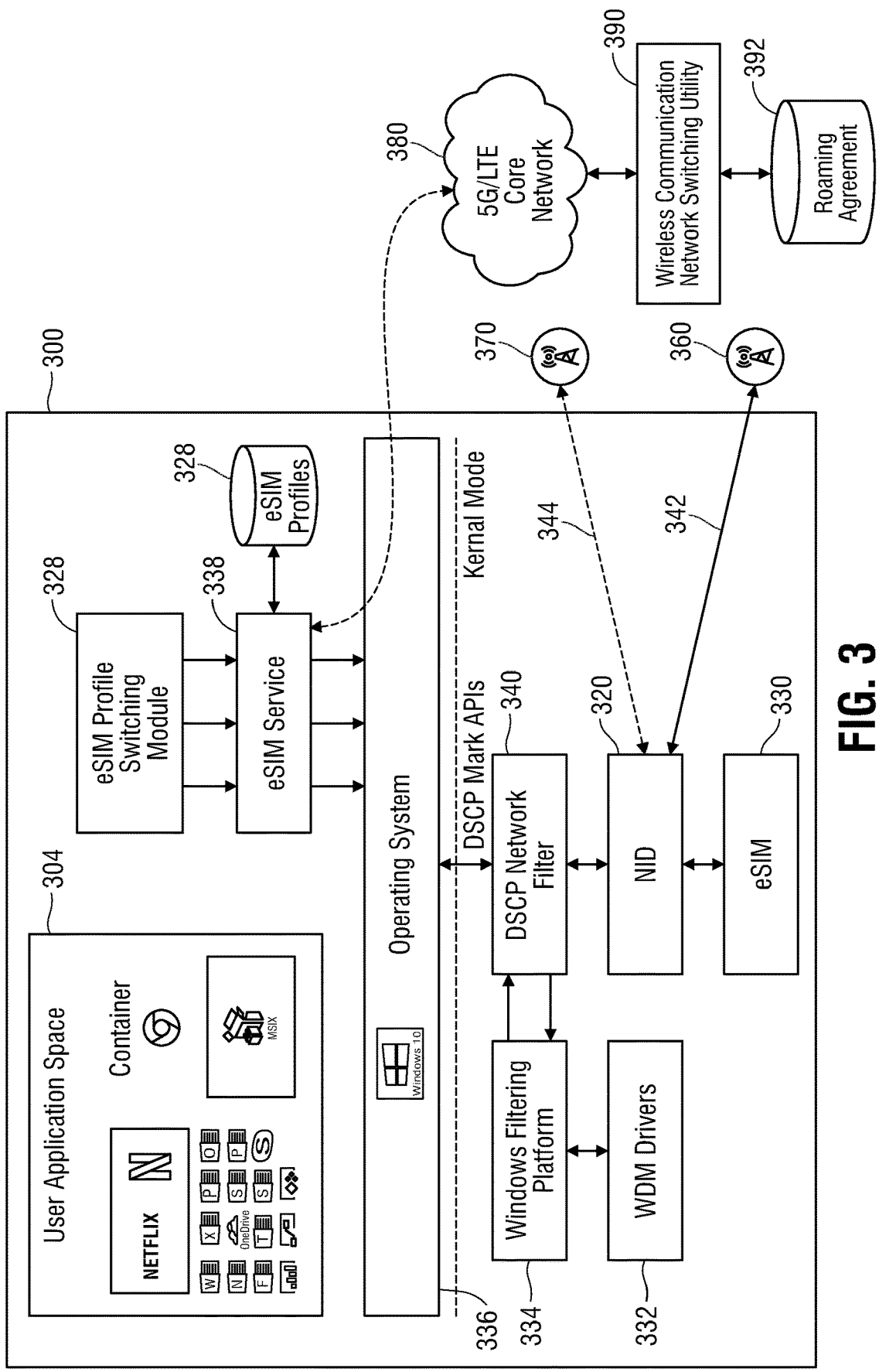
FIG. 3 is a block diagram illustrating an information handling system including an eSIM switching module according to an embodiment of the present disclosure.

FIG. 3 is a block diagram illustrating an information handling system 300 according to an embodiment of the present disclosure. Again, the information handling system 300 may include any wired or wireless connection allowing the information handling system 300 to communicatively couple to a 5G/LTE core communication network 380 that controls the information handling system's 300 connection to any of a plurality of wireless communication networks 360, 370 the via wireless communication network switching utility 390. As described herein, the information handling system 300 may initially be coupled to a first wireless communication network 360 via a first connection 342. The first connection 342 allows the information handling system 300 to be communicatively coupled to a voice communication network such as a cellular network and/or a server on an intranet or the Internet. Similarly, the second wireless communication network 370 may be an alternative source of data and voice transmission made available to the information handling system 300 at a different wireless service provider.

The information handling system 300 may include any data storage device that maintains any executable code for user applications being executed or capable of being executed by a processor of the information handling system 300 in a user application space 304. An operating system 336 may interface with this data storage device to retrieve executable computer code to present specific graphical user interfaces to the user of the information handling system 300 and operate various applications in the user application space 304. These applications in the user application space 304 may operate with wireless network data connections in embodiments herein. In an example, applications in the user application space 304 may access remote computing capabilities, data sources, or communications.

As described herein, the information handling system 300 includes a network interface device (NID) 320. The NID 320 may be responsible for detecting certain signals presented to the information handling system 300 and select among those signals the signal that has the strongest signal strength. The NID 320 may also cooperate with the eSIM profile switching module 328 to detect signal quality and switch communications from a first signal to a second signal associated with a first wireless communication network 360 and a second wireless communication network 370 respectively.

The NID 320 may be communicatively coupled to an eSIM 330. The eSIM 330 may be a programmable SIM card that allows for a plurality of communication network profiles stored thereon to allow for the addition or removal of communication network profiles used for subscribers to communicate with those respective wireless communication networks 360, 370. In a specific embodiment, the eSIM 330 may reference a separate eSIM profile database 328 to access data associated with the various profiles of the wireless communication networks 360, 370 that information handling system 300 has subscriptions to and load an appropriate eSIM profile. The eSIM 330 may access the eSIM profile database 328 when directed to switch profiles by the NID 320 according to the embodiments described herein.

During operation, an eSIM service 338 may initiate communication with the 5G/LTE core network 380 and a wireless communication network switching utility 390 via the NID 320 and eSIM 330 or via any wireless link available. This initiation of communication may be completed by creating a communication link between the information handling system 300 and the 5G/LTE core network 380 and the wireless communication network switching utility 390 using a default eSIM profile associated with, in this example, the first wireless communication network 360 or a WLAN or other wireless link in other embodiments. In a specific embodiment, this default eSIM profile associated with the first wireless communication network 360 may include information regarding a service contract by which the information handling system 300 may access the first wireless communication network 360 on a subscription basis. This two-way transmission may include a request from the NID 320 and eSIM 330 to communicatively couple the information handling system 300 to the first wireless communication network 360 with a response from the 5G/LTE core network 380 that the information handling system 300 may initiate the communication with that first wireless communication network 360 based on approval to do so. This first network 360 may be a "default" wireless communication network in an embodiment.

However, the signal associated with the first wireless communication network 360 may be insufficient to support a level of QoS for execution of a specific application at the information handling system 300. As described herein, one or more applications being executed on the information handling system 300 may require a certain level of signal strength, bandwidth, throughput, RSSI, among other QoS metrics, in order to transmit voice or data over the wireless connection. In this embodiment, the eSIM service 338 may direct the other components of the information handling system 300 to test the signal strength of the signal associated with the first wireless communication network 360. In a specific embodiment, the NID 320 may complete this signal strength test by detecting the amount of voice or data passing to the first wireless communication network 360 and comparing that with the requirements of the operating system 336 to effectively process the data. Testing may vary in samples or duration based on DSCP priority levels assigned to the data and communications of the detected applications execution in the user application space 304 the DSCP network filter 340. Where the demand for signal strength is being met, the communication with the default or first wireless communication network 360 may be maintained. However, if at any time this demand is not met either via reduced signal strength or a change in executed applications, the NID 320 may begin to search for another next strongest signal to switch to. This next strongest signal 344 may be associated with a second wireless communication network 370 that may be administered by a second carrier and may use different hardware from that of the first wireless communication network 360.

The NID 320, after detecting the next strongest signal 344, may begin to determine whether the eSIM profile of another wireless communication network is available to the client. For example, because the eSIM profile database 328 may contain a plurality of different eSIM profiles, the NID 320 and/or eSIM 330 may address to the eSIM profile database 328 to determine whether the profile associated with this next strongest signal 344 is available. If not, the NID 320 may select another, next strongest signal and repeat this process until it is determined that that profile associated with another second wireless communication network 370 is available to the information handling system 300 to use. If so, the NID 320 may perform an additional check on the signal strength to determine the signals stability. This may be done by the eSIM service 338 and eSIM profile switching module 328 directing the NID 320 to check the signal strength of this next strongest signal 344 a number of times for a period of time. For example, the NID 320 may check the signal strength three times over thirty seconds. Again, the NID 320 may check the stability of the signal strength of the next strongest signal 344 any number of times over any period of time and the present specification contemplates that these variables may change based on system design and functionalities. These signal stability checks may vary in number of time period depending on the DSCP priority assigned via the DSCP APIs by the DSCP network filter 340 to applications running on the user application space 304.

If the signal strength of the next strongest signal 344 is not consistent or stable, the process may continue with the NID 320 again searching for yet another next strongest signal 344. Where the signal is stable and consistent, the eSIM service 338 with the eSIM profile switching module 328 may direct the NID 320 and eSIM 330 to request a change from the first wireless communication network 360 to the second wireless communication network 370. This request may be sent to the 5G/LTE core network 380 at the wireless communication network switching utility 390 for determination of roaming status and switching based on those factors described herein. For example, the 5G/LTE core network 380 and wireless communication network switching utility 390 may accept the switch based on certain subscriber characteristics associated with the carrier of the first wireless communication network 360 relative to the second wireless communication network 370. This decision may also include determining whether a roaming agreement has been formed between the first wireless communication network 360 and the second wireless communication network 370 that is associated with the next strongest signal 344 at the wireless communication network switching utility 390 by the accessing roaming agreement database 392. Roaming may be used to seamlessly switch between the first wireless communication network 360 to the second wireless communication network 370 and avoid interruption in service during the switch. Where there is a roaming agreement, whether as a free service or charged service, the 5G/LTE core network 380 and wireless communication network switching utility 390 may direct the switching from the first wireless communication network 360 to the second wireless communication network 370 via roaming while the switch occurs and respond to the eSIM 330 to switch eSIM profiles. If no roaming agreement between the first wireless communication network 360 to the second wireless communication network 370, then a seamless switching is not necessarily guaranteed.

After receiving the response from the 5G/LTE core network 380, the eSIM 330 may reference the eSIM profile database 328 and update an eSIM profile for operation of the NID 320. The NID 320 may then switch from the signal associated with the first wireless communication network 360 to the next strongest signal 344 associated with the second wireless communication network 370 while roaming, of available, between the first wireless communication network 360 to the second wireless communication network 370 is invoked during any gaps caused by the switching of wireless communication networks. The eSIM service 338 may, in one embodiment, orchestrate these interactions between the eSIM 330, the NID 320, the eSIM profile database 328, and the eSIM profile switching module 328 as indicated so that the user does not detect the switching and the process appears seamless to the user of the information handling system 300.

The information handling system 300 may also include a differentiated service code point (DSCP) network filter 340, a filtering platform 334 (e.g., Windows® filtering platform), and WDM drivers 332 used to facilitate the transmission of data over the wireless communication networks 360, 370. The WDM drivers 332 may be used to specifically associate data from the information handling system 300 to the signals sent to any of the wireless communication networks 360, 370. The filtering platform 334 may interface with the DSCP network filter 340 to allow the data packets to be filtered appropriately by the DSCP network filter 340 to prioritize the data packets. Certain packet data may be associated with this transmitted data by the DSCP network filter 340 and marked via the execution of certain application programming interfaces (APIs) for application operating in the user application space 304. By marking these data packets, the priority of the data packets may be defined for transmission over the various hardware devices associated with the 5G/LTE core network 380 and wireless communication networks 360, 370. Data packets associated with different applications being executed on the information handling system 300 in the user application space 304 may receive different priorities by the DSCP network filter. As such, the NID 320 may check these priority markings, in a specific embodiment, for the data packets and use that data to help determine whether the first wireless communication network 360 or any other wireless communication networks 360, 370 is meeting a level of QoS as described herein.

Figure 4:
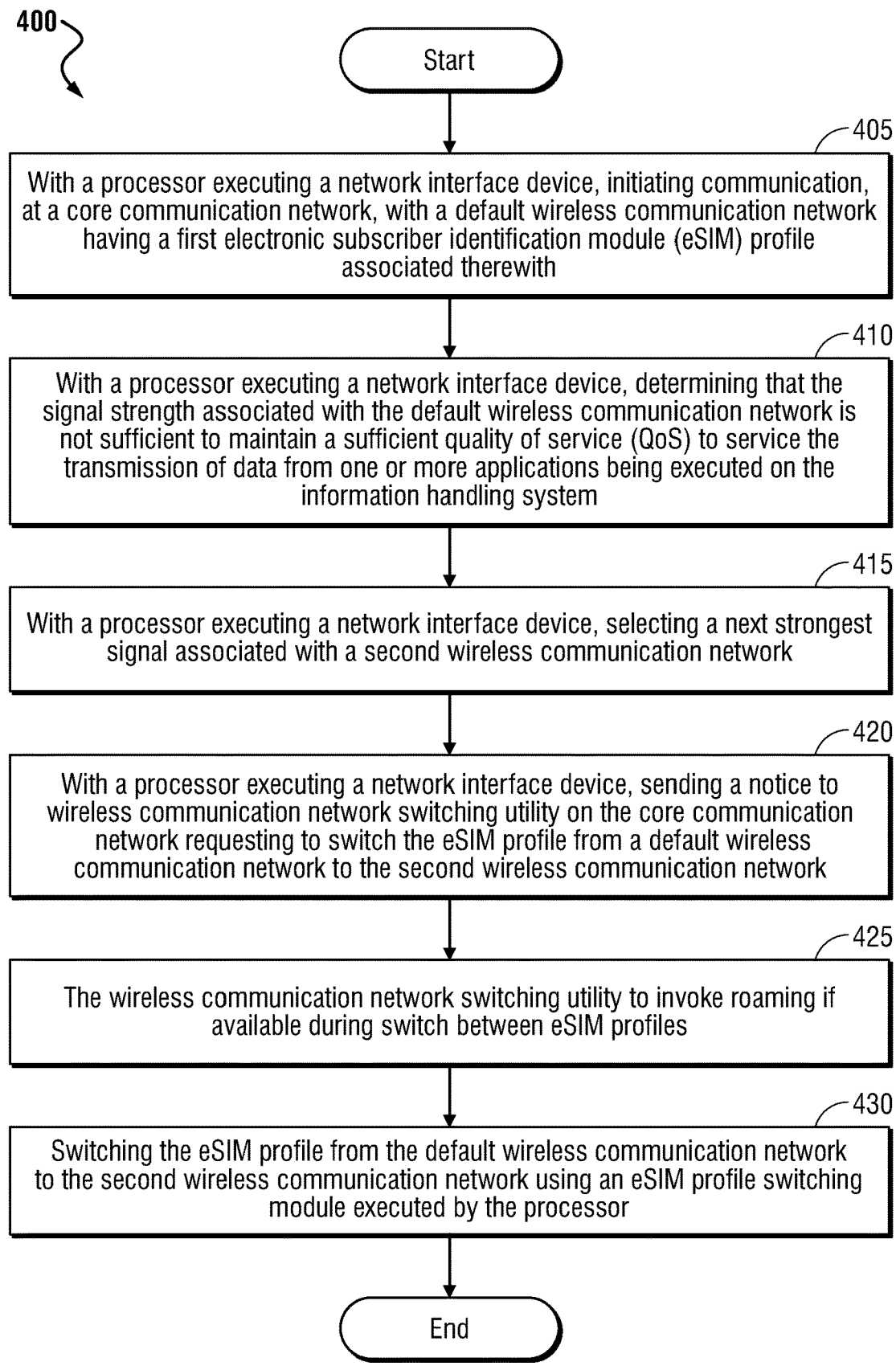
FIG. 4 is a flow diagram illustrating a method of dynamically switching between wireless communication networks at an information handling system according to an embodiment of the present disclosure.

FIG. 4 is a flow diagram illustrating a method 400 of dynamically switching between wireless communication networks at an information handling system according to an embodiment of the present disclosure. The method 400 may include, at block 405, with initiating communication, at a core communication network, with a default wireless communication network having a first embedded subscriber identity module (eSIM) profile associated therewith. This may be done by executing a network interface device with a processor in order to detect a signal associated with the default wireless communication network. In an example, a core communication network may receive the signal to communicatively couple the information handling system to the default wireless communication network and may send a signal to an eSIM card associated with the network interface device to apply the eSIM profile associated with the default wireless communication network and facilitate connection to the default wireless communication network.

At this time the method 400 may, at block 410, determine that the signal strength associated with the default wireless communication network is not sufficient to maintain a sufficient quality of service (QoS) to service the transmission of data from one or more applications being executed on the information handling system. This, again, may be completed by the network interface device being utilized by the processor. In some examples, where the signal strength associated with the default wireless communication network is sufficient to maintain a sufficient QoS to service the transmission of data, the process may simply end and the default wireless communication network may be maintained. However, ongoing monitoring of QoS conditions on active applications may continue. As mentioned herein, the metric of QoS that is sufficient to transmit data from any given application being executed on the information handling system may be based on the priority assigned to each data packet by a DSCP network filter at the information handling system. As described herein, the DSCP network filter may help to assign a priority to certain data packets based on the type of application the data originates from and the frequency of data packets from the execution of that application. Where the network interface device detects a high volume of high prioritized data packets being transmitted, the throughput and bandwidth necessary to transmit these packets may be compared to the ability of the signal associated with the default wireless communication network to transmit them.

Where the default wireless communication network is not sufficient to maintain a sufficient quality of service (QoS) to service the transmission of data from one or more applications being executed on the information handling system, the method 400 may proceed, at block 415, with selecting a next strongest signal associated with a first wireless communication network. The network interface device may perform those tests on the signal strength and stability as described herein. Specifically, in an embodiment, the network interface device may check the signal strength of this next strongest signal a number of times for a period of time. For example, the network interface device may check the signal strength three times over thirty seconds. The network interface device may check the stability of the signal strength any number of times over any period of time and the present specification contemplates that these variables may change based on system design and functionalities. The DSCP ranking of application data may also determine QoS monitoring levels implemented by the network interface device.

When the signal strength and stability is checked method 400 may, at block 420, continue with sending a notification and request to a wireless communication network switching utility on the core communication network regarding the switch of the eSIM profile from a default wireless communication network to a second wireless communication network. The notice may initiate the wireless communication network switching utility to check a roaming agreement database descriptive of whether the communication network associated with the next strongest signal has a roaming option with the carrier associated with the default wireless communication network.

The method 400 may continue at block 425 with invoking roaming if available during the switch between eSIM profiles using the wireless communication network switching utility. As described herein, roaming may be used to seamlessly switch between the first wireless communication network to the second wireless communication network and avoid interruption in service during the switch. Where there is no roaming allowed with the second wireless communication network associated with the next strongest signal, roaming may still occur to fill any gaps in service during switching at an incurred cost, but the roaming service is not guaranteed.

In the embodiment at block 430 where there is a roaming option, the wireless communication network switching utility may send a signal to the eSIM associated with the network interface device to update the eSIM profile and direct the network interface device to switch to the next strongest signal for communication with the wireless communication network associated therewith. This results in the switching of the eSIM profile from the default or first wireless communication network to another or second wireless communication network using an eSIM profile switching module executed by the processor at block 430 while roaming allows that switch to avoid service interruption. Additional processes may accompany the method 400 described herein.

FIG. 5 is a flow diagram illustrating a method 500 of dynamically switching between wireless communication networks at an information handling system according to another embodiment of the present disclosure. At block 501, the eSIM profile switching module determines if the information handling system is shutting down or needs to continue operating wirelessly. If not, the method 500 may proceed to bock 502. The eSIM profile switching module may continuously monitor for shutdown of the information handling system and its radios in the embodiments described herein.

At block 502, the method 500 may proceed with, in an example, an eSIM of an information handling system selecting a default eSIM profile associated with a first wireless communication network. The eSIM may load a default eSIM profile, in an embodiment, associated with a first wireless communication network with which a user has a subscription. The first wireless communication network may be associated with any particular or group of particular wireless communication carriers and the present method 500 may be executed as a carrier agnostic process that switches from one carrier associated with a wireless communication network to another carrier associated with another wireless communication network.

When the information handling system is communicatively coupled to the first wireless communication network, data and/or voice traffic is sent using the eSIM profile associated with the first wireless communication network at block 508 and the first wireless communication network may provide access to network communication at block 510 such as via a core network to the internet backend resources or other network resources. At this point the process may end. However, the method 500 also includes the ability to switch from the first wireless communication network to a second wireless communication network. To accomplish this, the network interface device of the information handling system may cause an eSIM service to be executed by a processor of the information handling system at block 504. The eSIM service may include one or more modules or hardware that, when executed, allows for such a switch. In a particular embodiment, an eSIM profile switching module may direct the network interface device to initiate a check on the signal strength of the first wireless communication network at block 504 as an impetus for switching. The network interface device may accomplish this by determining, at block 506, whether the data passed over the first wireless communication network via the default signal is meeting the data transmission requirements of an application executing on the information handling system.

In an embodiment, the eSIM profile switching module or other module within the information handling system may determine at block 506 whether the strength of the communication signal at the default wireless communication network is sufficient to meet a level of quality of service (QoS) for any data transmission. In a specific embodiment, the measurement of the QoS may include whether data requested or sent by one or more applications executed on the information handling system is being accomplished. Other QoS metrics may also be determined during this process. The QoS metric of any sort may be specifically measured by reviewing DSCP headers associated with the data packets being sent out for DSCP priority and comparing that priority to the needed signal quality, reliability, bandwidth, and throughput of data at any given time (aka: QoS metrics). Certain packet data may be associated with this transmitted data by a DSCP network filter and marked via the execution of certain application programming interfaces (APIs). By marking these data packets, the priority of the data packets may be defined for transmission over the various hardware devices associated with the 5G/LTE core network and wireless communication networks. Data packets associated with different applications being executed on the information handling system may receive different priorities by the DSCP network filter. As such, the network interface device may check these priority markings, in a specific embodiment, for the data packets and use that data to help determine whether the first wireless communication network (or any other wireless communication network being used) is meeting a level of QoS as described herein.

Where the determination is that the first wireless communication network is meeting the QoS sufficient for execution of a specific application at the information handling system (YES determination, block 506), the process may continue with the information handling system using the first wireless communication network. Where the determination is that the first wireless communication network is not meeting the QoS sufficient for execution of a specific application at the information handling system (NO determination, block 506), the process may continue with the eSIM profile switching module of the eSIM service directing the network interface device to scan for other signals associated with other wireless communication networks (e.g., cellular networks) at block 512. The results of the scan by a network interface device modem at block 512 may produce a list of other wireless communication networks and, in a specific, embodiment, list them from strongest signals to weakest signals.

At block 514, the method 500 may continue with the network interface device choosing another signal of threshold strength. In one specific embodiment, the other signal may be the next strongest signal from this list of available signals associated with the other wireless communication networks. At this point, the eSIM service may direct the eSIM profile switching module to determine whether the alternative wireless communication network is available to the client at block 516. The availability of the wireless communication network associated with the next strongest signal or another sufficient signal may be dependent on whether an eSIM profile exists within an eSIM profile database maintained on the information handling system and communicatively coupled to the eSIM service as determined at block 516. The eSIM profile software module checks a database of eSIM profiles at 516 to determine if an eSIM profile is present indicating an available access to the alternative wireless communication network. Where an eSIM profile is not present on the eSIM profile database (NO determination, block 516), the method 500 may continue by ignoring the next strongest signal or next selected signal at block 522 and return to selecting another, next strongest signal or another threshold-meeting signal on the list of available wireless communication networks.

Where an eSIM profile is present on the eSIM profile database (YES determination, block 516), the method 500 may continue with testing the stability of the next strongest signal or alternative signal. This may be done, at block 518, by periodically checking the strength of the next strongest signal or alternative signal over a period of time. For example, the network interface device may check the signal strength of the next strongest signal three times over thirty seconds in an embodiment. The network interface device may check the stability of the signal strength any number of times over any period of time and the present specification contemplates that these variables may change based on mobility, system design, and functionalities, such as active applications. For example, the frequency and duration of time this process takes may be dependent on data requirement of an application being or to be executed on the information handling system. For example, where a teleconferencing application is being executed having a high DSCP priority as determined from the DSCP priority input 519, the frequency and duration of the process of checking the signal strength of the next strongest signal may be increased to assure that the next strongest signal can maintain proper QoS criteria. Lower DSCP priority data may have less frequency or less duration of checking as determined by from the DSCP priority input 519.

At this point, the network interface device may determine whether the signal strength of the next strongest signal or other threshold-meeting signal is consistent at block 520. Where the signal strength of the next strongest signal or other threshold-meeting signal is not consistent (NO determination, block 520), the process may proceed with ignoring the next strongest signal or other threshold-meeting signal at block 522 and return to selecting another, next strongest signal or other threshold-meeting signal on the list of available wireless communication networks. Accordingly, where the signal strength of the next strongest signal or other threshold-meeting signal is consistent (YES determination, block 520), the process may proceed with the eSIM service directing the network interface device to send a notice to a wireless communication switching utility in a core communication network to switch from the first wireless communication network to the second wireless communication network associated with the next strongest signal or other threshold-meeting signal at block 526.

At this point, the process may be handled by the wireless communication switching utility in the core communication network. Specifically, the wireless communication network switching utility may, at block 528, review any service agreements between the first wireless communication network and the second wireless communication network from a roaming service agreement database to check to see if a roaming agreement exists between the first wireless communication network and second wireless communication network. At block 530, the wireless communication network switching utility determines whether, based on the agreements between the first wireless communication network and second wireless communication network, the second wireless communication network allows for roaming between networks. Roaming, for purposes of this specification, is meant to be understood as the process of using another wireless communication network's resources (e.g., hardware, software, processing power) per a service agreement.

Where the second wireless communication network does not allow for communications associated with the first wireless communication network to roam (NO determination, block 530), the method 500 may send a warning signal to the information handling system indicating that additional service roaming charges may be incurred to use roaming, if any is available during the switching from the first wireless communication network to the second wireless communication network at block 538. In this case, availability of roaming is not guaranteed and thus, neither is seamless service without service interruptions during the switch between eSIM profiles. If a user, for example, does not address this warning within a certain time, in some embodiments, the warning signal may time out at block 540 and a time out warning signal is sent to the information handling system at block 542 with the process starting over at block 512 with producing the list of other wireless communication networks and, in a specific, embodiment, list them from strongest signals to weakest signals. Where the warning signal does not time out (NO determination, block 540) the eSIM profile switching module may prompt a user with a warning, at block 544, to choose to allow or not to allow for these additional charges associated with the roaming process at block 546. The method may return to block 512 with producing the list of other wireless communication networks and, in a specific, embodiment, list them from strongest signals to weakest signals if the user does not allow roaming changes at block 546. Where the warning signal has not timed out (NO determination, block 540), the warning was shown to a user at block 544, and the user accepts those additional charges (YES determination, block 546), the process may continue, at block 534, with the eSIM service directing, via execution of the eSIM profile switching module, the eSIM to switch from the eSIM profile associated with the first wireless communication network to executing an eSIM profile associated with the second wireless communication network while any roaming, if available, is invoked for a change during the switch. Because the core communication network has negotiated the switch for the information handling system, the eSIM profile associated with the second wireless communication network (e.g., next strongest signal) is now set as the default eSIM profile at block 536. It is understood that setting the eSIM profile as the default eSIM profile at block 536 does not result in the information handling system using that second wireless communication network and instead the method 500 returns to block 501 to assess if the information handling system is being shut down. If so, the method 500 may end. If not, the method 500 returns to block 502 and 504 with checking the signal strength of the signal associated with the second wireless communication network while also gaining access to the communication network through its active eSIM profile. Once the switch is complete, the roaming function to the second wireless communication network may end and the active eSIM profile may conduct the wireless link to access backend network services at block 510. This permits switching between eSIM profiles without experiencing interruption if roaming is invoked.

It is understood that the method 500 also includes a situation where the second wireless communication network does allow for communications associated with the first wireless communication network to roam (YES determination, block 530). When this happens, the method 500 may send a message to the eSIM and the eSIM service to switch the eSIM profile to that of the second wireless communication network. Again, at block 534, the eSIM service directs, via execution of the eSIM profile switching module, the eSIM to switch from the eSIM profile associated with the first wireless communication network to executing an eSIM profile associated with the second wireless communication network. Because the wireless communication switching utility in the core communication network has negotiated the switch for the information handling system and invoked roaming during the switch of eSIM profiles, the eSIM profile associated with the second wireless communication network (e.g., the next strongest signal) is now set as the default eSIM profile at block 536. Again, it is understood that setting the eSIM profile as the default eSIM profile at block 536 does not result in the information handling system using that second wireless communication network and instead the method 500 returns to block 501 to assess if the information handling system is being shut down. If so, the method 500 may end. If not, the method 500 returns to block 502 and 504 with checking the signal strength of the signal associated with the second wireless communication network while also gaining access to a communication network through its active eSIM profile. Once the switch is complete, the roaming function to the second wireless communication network may end and the active eSIM profile may conduct the wireless link to access backend network services at block 510. This permits switching between eSIM profiles without experiencing interruption if roaming is invoked.

The blocks of the flow diagrams of FIGS. 5 and 6 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A method of dynamically switching between wireless communication networks at an information handling system, comprising:
  with a processor executing a network interface device:
    initiating communication with a default wireless communication network having a first embedded subscriber identity module (eSIM) profile associated therewith;
    determining that the signal strength associated with the default wireless communication network is not sufficient to maintain a sufficient quality of service (QoS) to service the transmission of data from an application being executed on the information handling system;
    selecting another signal associated with a second wireless communication network meeting a threshold signal level; and
    sending a request to a wireless communication network switching utility at a core communication network notifying of a switch from the first eSIM profile for the default wireless communication network to a second eSIM profile for the second wireless communication network and to request initiation of roaming services between the default wireless communication network and the second wireless communication network during the eSIM profile switching;
    receiving, upon a user of the information handling system's switching approval, a message from the wireless communication network switching utility at the core communication network to switch to the second eSIM profile of the second wireless communication network; and switching the network interface device, via the processor, to the second eSIM profile of the second wireless communication network using an eSIM profile switching module executed by the processor in response to the switching approval message and initiating roaming, if available, between the default wireless communication network and the second wireless communication network during the switch between first and second eSIM profiles to avoid service interruption during the switching, wherein monitoring, via the network interface device, a signal strength of the default wireless communication network is conducted a number of times for a length of time based on QoS requirements of any application being executed on the information handling system before requesting from the wireless communication network switching utility that the first eSIM profile be switched to the second eSIM profile.

2. The method of claim 1, further comprising:
receiving an indication from the wireless communication network switching utility at the core communication network to the information handling system that the switch between the eSIM profiles from the default wireless communication network to second first wireless communication network will result in additional roaming charges.

3. The method of claim 1, further comprising:
selecting a next strongest signal detected as the second communication network after the network interface device has scanned for communication networks available to the information handling system.

4. The method of claim 1, wherein the monitoring of the signal strength of the default wireless communication network is conducted based on a differentiated service code point (DSCP) priority ranking of data from an active application executing on the information handling system to determine QoS sufficiency.

5. The method of claim 1, further comprising:
receiving a warning at the network interface device that roaming charges may be applied resulting from roaming during a switch from the default wireless communication network to the second wireless communication network if roaming is available; and
sending a notification to the wireless communication network switching utility of an indication whether the user accepts roaming charges.

6. The method of claim 1, wherein communication with the wireless communication network switching utility at the core communication network may be conducted via a wireless local area network (WLAN) separate from the default wireless communication network or the second wireless communication network.

7. The method of claim 1, further comprising:
receiving, at the network interface device, a signal that a roaming charge warning signal has timed out; and
scanning for and selecting a next strongest signal associated with a third wireless communication network.

8. An information handling system, comprising:
a processor;
a memory;
a network interface device to communicatively couple the information handling system to one of a plurality of wireless communication networks, where the network interface device is communicatively coupled for communication with a default wireless communication network;
an embedded subscriber identity module (eSIM) with a first eSIM profile;

the processor executing an eSIM profile switching module to:
monitor for signal strengths of each of a plurality of wireless communication networks for a second signal meeting a threshold signal level;
monitor, via the network interface device, a signal strength of the default wireless communication network conducted a number of times for a length of time based on QoS requirements of any application being executed on the information handling system before requesting from a wireless communication network switching utility that the first eSIM profile be switched to a second eSIM profile;
upon discovering that the default wireless communication network has insufficient quality of service (QoS) to sustain sufficient data transmission between the information handling system and the default wireless communication network and upon receiving a user of the information handling system's switching approval, send a request to the wireless communication network switching utility at a core communication network notifying of a switch from the first eSIM profile for the default wireless communication network to the second eSIM profile of a second wireless communication network having the second signal and to initiate roaming between the default wireless communication network and the second wireless communication network during the switching between the first eSIM profile and the second eSIM profile;
receive, upon a user of the information handling system's switching approval, a message signal from the wireless communication network switching utility at the core communication network to switch to the eSIM profile of the second wireless communication network; and
switch communication of the network interface device to the second wireless communication network with the second eSIM profile associated with the second wireless communication network at the information handling system and conduct roaming communications during the switch to the second wireless communication network to avoid wireless network service interruption.

9. The information handling system of claim 8, wherein the network interface device receives an indication from the wireless communication network switching utility at the core communication network that switching the eSIM profile from the default wireless communication network to the second wireless communication network will result in additional roaming charges if roaming is available.

10. The information handling system of claim 8, wherein the network interface device iteratively monitors for the signal strength related to each of the plurality of wireless communication networks to sustain wireless network data flow for applications actively executing on the information handling system.

11. The information handling system of claim 8, wherein the network interface device determines whether a wireless data communication signal from the default wireless communication network has sufficient quality of service (QoS) to service the transmission of data from an application being executed on the information handling system and, if so, maintaining a wireless link coupling to the default wireless communication network.

12. The information handling system of claim 8, wherein the network interface device determines whether a data communication signal from the default wireless communication network has insufficient QoS to service the transmission of data from an application being executed on the information handling system and, where the QoS is not sufficient, the network interface device selects the second wireless communication network having a next strongest signal strength.

13. The information handling system of claim 8, wherein the network interface device monitors the signal strength of the second signal from the second wireless communication network a number of times for a length of time before requesting from the wireless communication network switching utility at the core communication network that the first eSIM profile be switched to the second eSIM profile.

14. The information handling system of claim 8, wherein the network interface device monitors the signal strength of the default wireless communication network the number of times for the length of time based on a differentiated service code point (DSCP) priority ranking of data from an active application executing on the information handling system to determine QoS sufficiency before requesting from the wireless communication network switching utility at the that the first eSIM profile be switched to the second eSIM profile.

15. An information handling system, comprising:
a processor;
a memory;
a network interface device to communicatively couple the information handling system to one of a plurality of wireless communication networks, where the network interface device is communicatively coupled for communication with a default wireless communication network;
an embedded subscriber identity module (eSIM) with a first eSIM profile;
the processor executing an eSIM profile switching module to:
monitor for signal strengths of each of a plurality of wireless communication networks for a second signal meeting a threshold signal level;
monitor, via the network interface device, a signal strength of the default wireless communication network conducted a number of times for a length of time based on QoS requirements of any application being executed on the information handling system before requesting from a wireless communication network switching utility that the first eSIM profile be switched to a second eSIM profile;
upon discovering that the default wireless communication network has insufficient quality of service (QoS) to sustain sufficient data transmission between the information handling system and the default wireless communication network, send a request to the wireless communication network switching utility at a core communication network notifying of a switch from the first eSIM profile for the default wireless communication network to the second eSIM profile of a second wireless communication network having the second signal and to initiate roaming between the default wireless communication network and the second wireless communication network during the switching between the first eSIM profile and the second eSIM profile;
receive, upon a user of the information handling system's switching approval, a message signal from the wireless communication network switching utility at the core communication network to switch to the eSIM profile of the second wireless communication network; and
switch communication of the network interface device to the second wireless communication network with the second eSIM profile associated with the second wireless communication network at the information handling system and conduct roaming communications during the switch to the second wireless communication network to avoid wireless network service interruption.

16. The information handling system of claim 15, wherein the network interface device receives an indication from the wireless communication network switching utility at the core communication network that switching the eSIM profile from the default wireless communication network to the second wireless communication network will result in additional roaming charges if roaming is available.

17. The information handling system of claim 15, wherein the network interface device iteratively monitors for the signal strength related to each of the plurality of wireless communication networks to sustain wireless network data flow for applications actively executing on the information handling system.

18. The information handling system of claim 15, wherein the network interface device determines whether a wireless data communication signal from the default wireless communication network has sufficient quality of service (QoS) to service the transmission of data from an application being executed on the information handling system and, if so, maintaining a wireless link coupling to the default wireless communication network.

19. The information handling system of claim 15, wherein the network interface device determines whether a data communication signal from the default wireless communication network has insufficient QoS to service the transmission of data from an application being executed on the information handling system and, where the QoS is not sufficient, the network interface device selects the second wireless communication network having a next strongest signal strength.

20. The information handling system of claim 15, wherein the network interface device monitors the signal strength of the default wireless communication network the number of times for the length of time based on a differentiated service code point (DSCP) priority ranking of data from an active application executing on the information handling system to determine QoS sufficiency before requesting from the wireless communication network switching utility at the that the first eSIM profile be switched to the second eSIM profile.

* * * * *